(12) United States Patent
Asaoka et al.

(10) Patent No.: US 10,981,315 B2
(45) Date of Patent: Apr. 20, 2021

(54) STATE DETERMINATION DEVICE

(71) Applicant: FANUC CORPORATION, Yamanashi (JP)

(72) Inventors: Hiroyasu Asaoka, Yamanashi (JP); Atsushi Horiuchi, Yamanashi (JP); Kenjirou Shimizu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 269 days.

(21) Appl. No.: 16/162,402

(22) Filed: Oct. 17, 2018

(65) Prior Publication Data

US 2019/0118443 A1 Apr. 25, 2019

(30) Foreign Application Priority Data

Oct. 23, 2017 (JP) .............................. JP2017-204174

(51) Int. Cl.
*B29C 45/76* (2006.01)
*G06N 3/08* (2006.01)
(Continued)

(52) U.S. Cl.
CPC ............ *B29C 45/76* (2013.01); *G05B 23/024* (2013.01); *G05B 23/0235* (2013.01);
(Continued)

(58) Field of Classification Search
CPC .......... B29C 45/76; B29C 2945/76949; B29C 37/0096; B29C 45/768; G06N 3/08;
(Continued)

(56) References Cited

U.S. PATENT DOCUMENTS

2009/0240366 A1\* 9/2009 Kaushal ................. G06N 20/00
700/110
2010/0065979 A1 3/2010 Betsche et al.
(Continued)

FOREIGN PATENT DOCUMENTS

DE 102006031268 A1 1/2008
FR 2698704 A1 6/1994
(Continued)

*Primary Examiner* — Ziaul Karim
(74) *Attorney, Agent, or Firm* — Hauptman Ham, LLP

(57) ABSTRACT

A state determination device includes: a primary determination learning model that has learned an outline of a state of a manufacturing device based on a state variable acquired from a manufacturing operation of a product of the manufacturing device; and a secondary determination learning model that has learned a state of the manufacturing device based on a state variable acquired from a predetermined operation pattern set in advance and maintenance information. Then, a primary determination is made on the outline of the state of the manufacturing device using the primary determination learning model based on the state variable acquired from the manufacturing operation of the product, and further, a secondary determination is made on the state of the manufacturing device using the secondary determination learning model based on the state variable acquired from the predetermined operation pattern.

4 Claims, 3 Drawing Sheets

(51) Int. Cl.
*G06N 3/04* (2006.01)
*G05B 23/02* (2006.01)
*G06N 20/00* (2019.01)

(52) U.S. Cl.
CPC ............ *G06N 3/0454* (2013.01); *G06N 3/08* (2013.01); *G06N 20/00* (2019.01); *B29C 2945/76949* (2013.01)

(58) Field of Classification Search
CPC .... G06N 3/0454; G06N 20/00; G05B 23/024; G05B 23/0235
See application file for complete search history.

(56) References Cited

U.S. PATENT DOCUMENTS

| | | |
|---|---|---|
| 2016/0291552 A1 | 10/2016 | Pal et al. |
| 2017/0028593 A1* | 2/2017 | Maruyama ............ B29C 45/768 |
| 2017/0293862 A1* | 10/2017 | Kamiya ................. G01N 29/14 |
| 2019/0033840 A1 | 1/2019 | Fujita et al. |

FOREIGN PATENT DOCUMENTS

| | | |
|---|---|---|
| JP | 2012-14584 A | 1/2012 |
| JP | 2014-203125 A | 10/2014 |
| JP | 2017-30221 A | 2/2017 |
| JP | 2017-138789 A | 8/2017 |
| JP | 2017-188030 A | 10/2017 |

* cited by examiner

STATE DETERMINATION DEVICE

RELATED APPLICATIONS

The present application claims priority of Japanese Patent Application No. 2017-204174, filed on Oct. 23, 2017, the disclosure of which is hereby incorporated by reference herein in its entirety.

BACKGROUND OF THE INVENTION

1. Field of the Invention

The present invention relates to a scale determination device of a manufacturing device.

2. Description of the Related Art

Maintenance of manufacturing devices such as an injection molding machine is performed regularly or when an abnormality occurs. As an example of a method for determining a state of the manufacturing device at the time of maintenance of the manufacturing device, a method of recording of data acquired from a movable portion and a sensor of the manufacturing device, comparing the recorded data with data acquired from the movable portion and the sensor during a normal operation to determine whether an operation of the manufacturing device is normal or not based on whether or not deviation exceeds a preset threshold, or the like has been known. In this manner, the determination on the state of an operation by the manufacturing device is performed at the time of maintaining the manufacturing device by using a physical quantity indicating an operation state recorded during the operation of the manufacturing device.

As the related art for determining a state of a manufacturing device, for example, Japanese Patent Application Laid-Open 2014-203125 and Japanese Patent Application Laid-Open 2012-014584 disclose a technique relating to an injection molding machine as a manufacturing device in which a load in at least one cycle work in which a normal mold opening/closing operation or an ejection has been performed or a load obtained by calculating a moving average of a plurality of work cycles is set as a reference load. In addition, Japanese Patent Application Laid-Open 2017-030221 discloses a technique of receiving input of data on a manufacturing operation of a product using an injection molding machine as a manufacturing device and diagnosing an abnormality of the injection molding machine by means of a machine learning device.

However, in manufacturing devices that manufacture a large variety of product, which includes an injection molding machine, there is a characteristic that conditions in manufacturing of a product; in the case of the injection molding machine, for example, machining conditions, such as a material and a die used for manufacturing a product, a temperature condition at the time of manufacturing, a mold clamping condition, and an injection condition, are different depending on each variety. Therefore, even the techniques disclosed in Japanese Patent Application Laid-Open 2014-203125 and Japanese Patent Application Laid-Open 2012-014584 are used, it is difficult to accurately estimate a cause of an abnormality according to each condition.

On the other hand, when the machine learning device is used to detect an abnormality as disclosed in Japanese Patent Application Laid-Open 2017-030221, it is easy to improve an accuracy at the time of determining a cause of the abnormality or the like as the number of uncertain factors is smaller in data used for determination, and further, it is possible to construct a machine learning model with a simple configuration. For example, in the case of machine learning that determines a wear state based on a load of a constituent element, there is a tendency that it is easy to distinguish between normality and an abnormality when fixing an operation pattern for determination. However, in actual molding of the injection molding machine, for example, as the manufacturing device, there are various materials, dies, machining conditions, and the like as described above, so that it is difficult, as a practical problem, to perform a common operation for the entire molding during actual molding. In addition, if an operation for manufacturing is interrupted in order to determine an operation state in a manufacturing device that continues to manufacture the same product while keeping manufacturing conditions (temperature balance and the like) constant as in the injection molding machine, it takes time to resume the manufacturing operation, and there is a problem that a manufacturing process is greatly delayed. As a result, there arises a problem that there is a restriction in performing a highly accurate determination of an abnormality cause in the manufacturing device during the manufacturing operation.

SUMMARY OF THE INVENTION

Therefore, an object of the present invention is to provide a state determination device and a machine learning device capable of determining a state of a manufacturing device with high accuracy.

In the present invention, a plurality of machine learning devices are introduced to a state determination device of a manufacturing device, and stepwise state determination (primary determination and secondary determination) is performed by using the plurality of machine learning devices to make a more detailed determination on an operation state or a comprehensive determination, thereby solving the above problem.

In the primary determination performed by the state determination device of the present invention, a schematic state of the manufacturing device is determined based on a state quantity relating to the operation of the manufacturing device acquired from an operation during a normal operation of the manufacturing device (during manufacture of a product). As described above, it is difficult to determine an exact operation state of the manufacturing device from the data acquired from the operation of the manufacturing device during manufacture of the product, but there is a possibility that it is possible to make a determination to a certain extent of whether the operation of the manufacturing device is normal or abnormal and which portion has a possibility of occurrence of an abnormality in the case where the operation is abnormal. In the primary determination performed by the state determination device of the present invention, the state of the manufacturing device is subjected to primary division.

In the secondary determination performed by the state determination device of the present invention, on the other hand, the operation of the manufacturing device is interrupted, for example, and an additional sensor for determination is installed, or the manufacturing device is operated with an operation pattern for determination to acquire data, thereby making a detailed determination on the state of the manufacturing device.

A state determination device according to the present invention is configured to determine a state of a manufacturing device based on internal and external state variables acquired from an operation of the manufacturing device, and includes: a primary determination learning model that has learned an outline of the state of the manufacturing device based on the state variable acquired from a manufacturing operation of a product of the manufacturing device; a secondary determination learning model that has learned a state of the manufacturing device based on the state variable acquired from a predetermined operation pattern set in advance of the manufacturing device and information on maintenance of the manufacturing device; and a determination result output unit that carries out a primary determination on the outline of the state of the manufacturing device using the primary determination learning model based on the state variable acquired from the manufacturing operation of the product of the manufacturing device and carries out a secondary determination on the state of the manufacturing device using the secondary determination learning model based on the state variable acquired from the predetermined operation pattern set in advance of the manufacturing device executed at a predetermined opportunity.

The predetermined opportunity may be at least any of within a predetermined period from a time when the primary determination is carried out, within a predetermined number of times of product manufacturing operations of the manufacturing device, and within a predetermined number of times of operations of the manufacturing device.

The state variable used for the secondary determination can include a detection value of a sensor which is not included in the state variable used for the primary determination.

The state determination device may be configured as a part of a controller of the manufacturing device.

The state determination device may be configured as a part of a computer connected to a plurality of the manufacturing devices via a network.

In the state determination device of the present invention, the state of the manufacturing device is grasped to a certain extent by the primary determination during the operation of the manufacturing device, which would be inefficient if stopped during manufacture of the product, and it is possible to temporarily interrupt the manufacture of the product of the manufacturing device at an appropriate timing if necessary and determine the state of the state determination device in more detail by the secondary determination. Therefore, it is possible to determine the state of the manufacturing device efficiently with high accuracy without unnecessarily lengthening a cycle time of the manufacture of the product.

In addition, sensors configured to detect detailed operation states are generally expensive in many cases, so that there arises a problem in terms of cost if such sensors are prepared as many as all the manufacturing devices installed in a factory. However, in the state determination device of the present invention, it is only necessary to divide a schematic state of the manufacturing device by the primary determination during the manufacture of the product of the manufacturing device, and an expensive sensor is not required in such a primary determination in many cases, and thus, it is usually enough if the manufacturing device is operated without installing the sensor and the sensor is attached to the manufacturing device when the secondary determination is required, so that it is possible to prepare only one sensor and share the sensor, for example.

That is, according to the present invention, it is possible to schematically divide the state of the manufacturing machine based on the operation during the manufacture of the product of the manufacturing device having many uncertain factors, and it is possible to determine a cause of an abnormality by performing the more detailed state determination as necessary, and thus, it is possible to determine the cause of the abnormality of the manufacturing device efficiently with high accuracy.

DETAILED DESCRIPTION OF THE PREFERRED EMBODIMENTS

Figure 1:
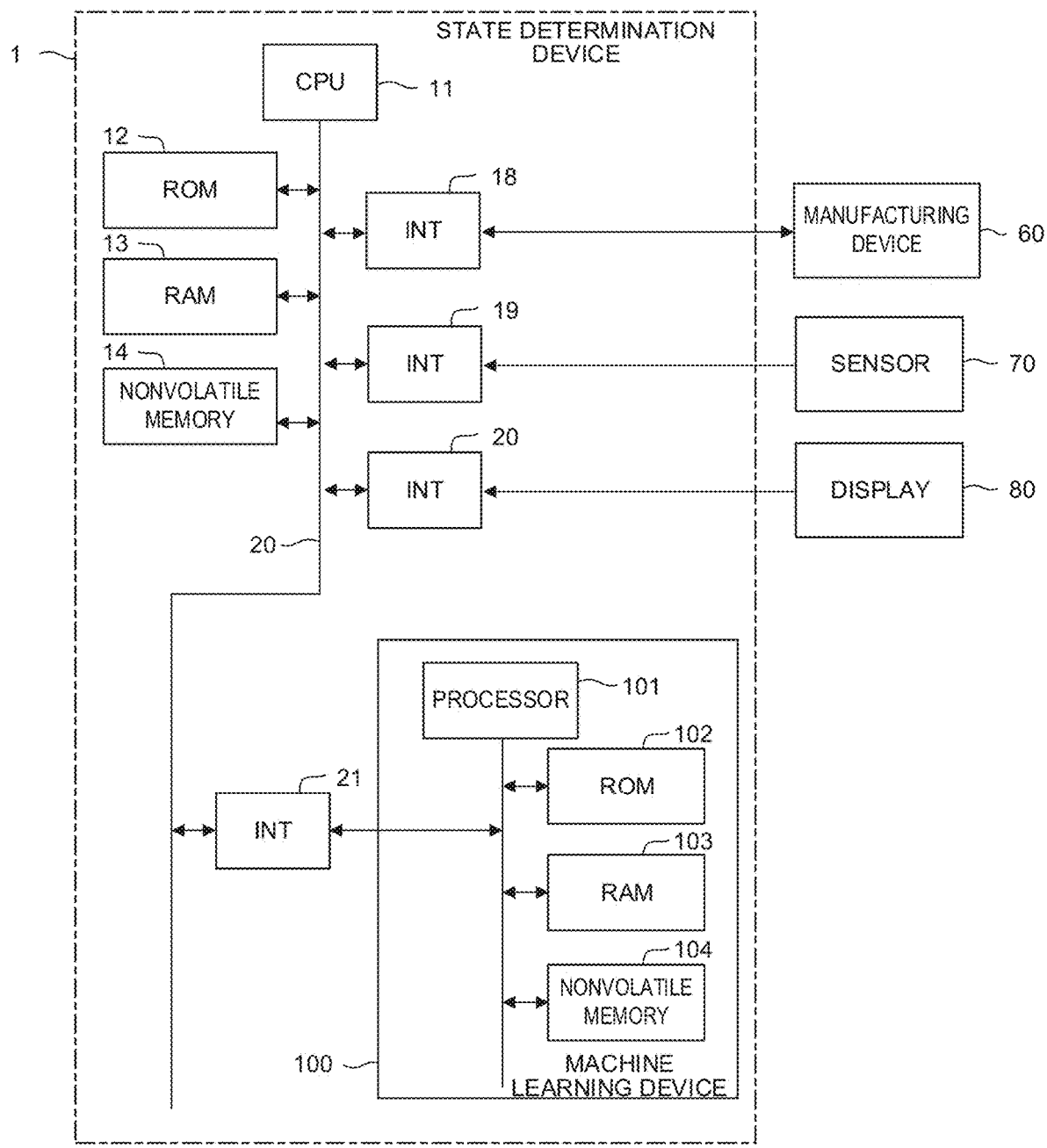
FIG. 1 is a schematic hardware configuration diagram of a state determination device according to a first embodiment.

FIG. 1 is a schematic hardware configuration diagram illustrating a main part of a state determination device according to a first embodiment.

A state determination device 1 can, for example, be mounted as a part of a controller of a manufacturing device, mounted as a part of a computer such as a personal computer installed together with the controller of the manufacturing device, and mounted as a part of a computer such as a cell computer, a host computer, and a cloud server connected to a controller of a plurality of manufacturing devices via a network. A CPU 11 included in the state determination device 1 according to the present embodiment is a processor that performs overall control of the state determination device 1, reads a system program stored in a ROM 12 via a bus 20, and controls the entire state determination device 1 according to the system program. The RAM 13 temporarily stores temporary calculation data and display data, various types of data input by an operator via an input unit (not illustrated), and the like.

A nonvolatile memory 14 is configured as a memory whose storage state is maintained even when a power supply of the state determination device 1 is turned off, for example, by being backed up by a battery (not illustrated). The nonvolatile memory 14 stores various types of data input by the operator via the input unit (not illustrated), various types of data acquired from a manufacturing device 60 via an interface 19 (for example, a model number of the manufacturing device 60, a setting value of each parameter, information on an operation of the manufacturing device 60, and the like), various types of detection value data acquired from a sensor 70 via an interface 18 (for example, a temperature value when the sensor 70 is a temperature sensor, a distance value when the sensor 70 is a distance sensor, or the like), a program input through an interface (not illustrated), and the like. The programs and various types of data stored in the nonvolatile memory 14 may be developed in the RAM 13 at the time of being executed and/or used. In addition, various system programs such as a known analysis program (including a system program configured to control interaction with a machine learning device 100 to be described later) are written in advance in the ROM 12.

The sensor 70 is provided to observe the manufacturing device 60 from the outside. The sensor 70 includes a visual sensor, an audio sensor, a temperature sensor, a distance sensor, and the like. The sensor 70 detects information relating to an operation of the manufacturing device 60 that is hardly detected by the manufacturing device 60 itself, and notifies the CPU 11 of the detected information via the interface 18. Although the sensor 70 is not an indispensable configuration for the state determination device 1, it is possible to improve the accuracy of abnormality determination by using the sensor 70 for secondary determination of the state determination device 1 or the like.

The manufacturing device 60 is a machine whose state is to be determined by the state determination device 1. The manufacturing device 60 includes a machining machine such as a robot, a machine tool, an electric discharge machine, and an injection molding machine. The manufacturing device 60 can receive an operation command from the CPU 11 through a signal or the like via the interface 19 to control each unit. In addition, the manufacturing device 60 detects a current value and the like supplied to a sensor, a motor, and the like provided in each unit, and notifies the CPU 11 of the detected values via the interface 19.

An interface 21 is an interface configured to connect the state determination device 1 and the machine learning device 100. The machine learning device 100 includes: a processor 101 controlling the entire machine learning device 100; a RCM 102 storing a system program and the like; a RAM 103 for temporary storage in each process relating to machine learning; and a nonvolatile memory 104 used to store a learning model and the like. The machine learning device 100 can observe each piece of information (a model number of the manufacturing device 60, a setting value of each parameter, data relating to the operation of the manufacturing device 60 acquired from the manufacturing device 60 or the sensor 70, or the like) that can be acquired by the state determination device 1 via the interface 21. In addition, the state determination device 1 receives a result of determination on a state of the manufacturing device 60 output from the machine learning device 100, and displays a message or the like based on the determination result on a display 80 or controls the operation of the manufacturing device 60.

Figure 2:
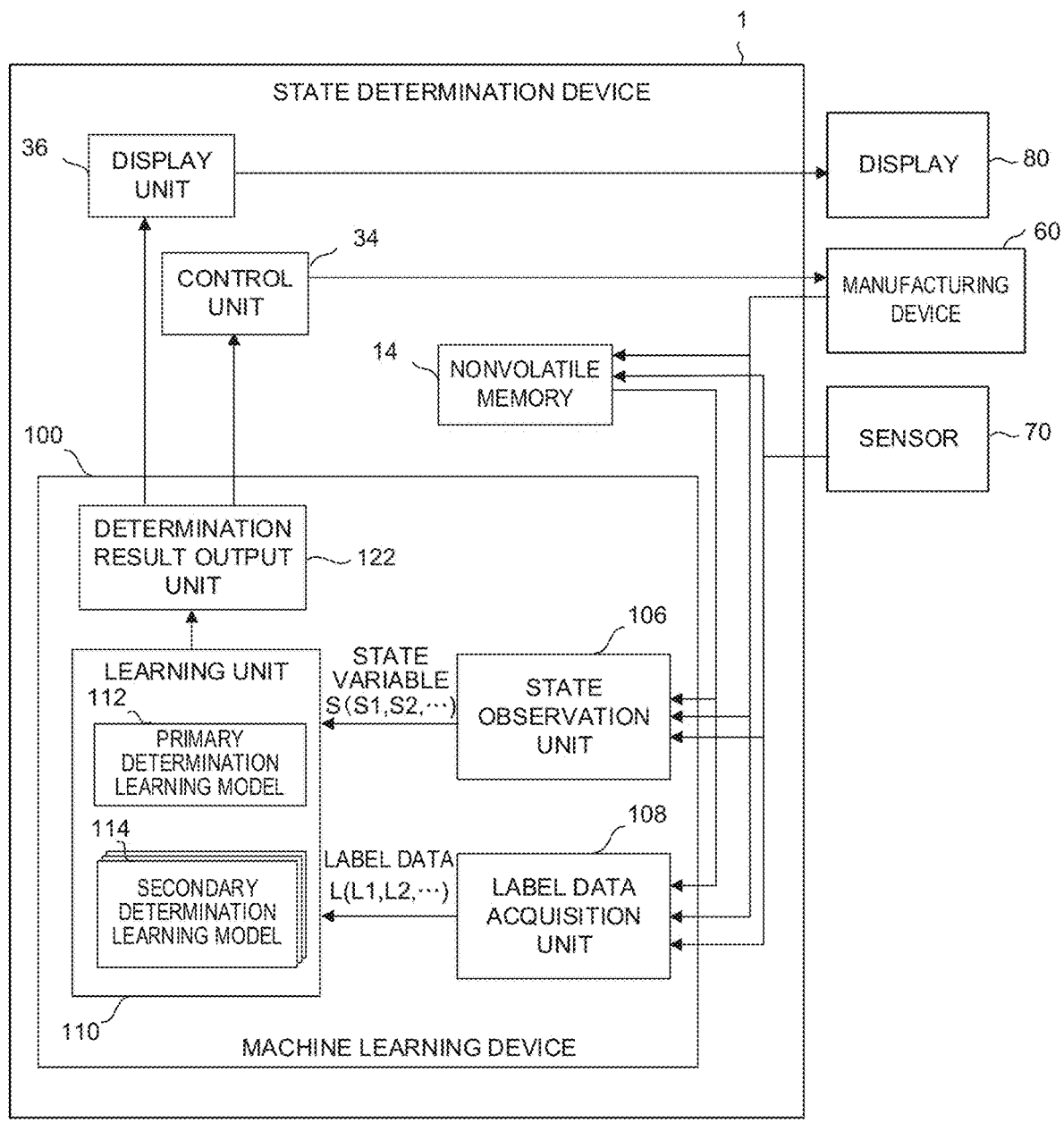
FIG. 2 is a schematic functional block diagram of the state determination device according to the first embodiment.

FIG. 2 is a schematic functional block diagram of the state determination device 1 and the machine learning device 100 according to the first embodiment.

Each function block illustrated in FIG. 2 is realized as the CPU 11 of the state determination device 1 illustrated in FIG. 1 and the processor 101 of the machine learning device 100 execute the respective system programs and control operations of the respective units of the state determination device 1 and the machine learning device 100.

The state determination device 1 of the present embodiment includes a control unit 34 that outputs a command to control the operation of the manufacturing device 60 based on the result of the state determination of the manufacturing device 60 output from the machine learning device 100. The command output by the control unit 34 includes, for example, control for switching the manufacturing device 60 to a secondary determination mode at a timing when a manufacturing operation of a product of the manufacturing device 60 is performed a predetermined number of times, a timing when a predetermined operation of the manufacturing device 60 is performed a predetermined number of times, or a timing when a series of manufacturing processes currently being executed by the manufacturing device 60 is completed, control for interrupting the manufacturing process currently being executed by the manufacturing device 60 and forcibly switching the manufacturing device 60 to the secondary determination mode, or the like, within a predetermined period set in advance from a timing when it is determined in the primary determination that a certain abnormality has occurred in the manufacturing device 60.

The state determination device 1 of the present embodiment includes a display unit 36 that displays guidance or the like on the display 80 based on the result of the state determination of the manufacturing device 60 output from the machine learning device 100. The display unit 36 displays a fact that the manufacturing device 60 is switched to the operation mode for secondary determination on the display 80 at the timing when the manufacturing operation of the product of the manufacturing device 60 is performed the predetermined number of times, the timing when the predetermined operation of the manufacturing device 60 is performed the predetermined number of times, or the timing when the series of manufacturing processes, currently being executed, is completed, or displays a fact that the manufacturing process currently being executed by the manufacturing device 60 is interrupted and the manufacturing device 60 is forcibly switched to the operation mode for the secondary determination on the display 80, within a predetermined period set in advance from the timing when it is determined in the primary determination that a certain abnormality has occurred in the manufacturing device 60. In addition, after switching to the operation mode for the secondary determination, the display unit 36 may display guidance to attach the additional sensor 70 to the manufacturing device 60 on the display 80.

The machine learning device 100 included in the state determination device 1 of the present embodiment includes software (a learning algorithm or the like) for learning the state of the manufacturing device 60 with respect to the operation of the manufacturing device 60 by itself through so-called machine learning, and hardware (the processor 101 and the like). What the machine learning device 100 included in the state determination device 1 learns corresponds to a model structure representing a correlation between an operation of the manufacturing device 60 and a state of the manufacturing device 60.

As illustrated in the functional block in FIG. 2, the machine learning device 100 included in the state determination device 1 includes: a state observation unit 106 that observes manufacturing operation data S1 which is data relating to the operation at the time of manufacturing the product of the manufacturing device 60 and secondary determination operation data S2 which is data relating to the operation for secondary determination of the manufacturing device 60 as internal and external state variables S of the manufacturing device 60; a label data acquisition unit 108 that acquires determination data L including state label data L1 indicating the state of the manufacturing device 60; and a learning unit 110 that performs learning relating to the primary determination based on the manufacturing operation data S1 and learning relating to the secondary determination using the state variable S and the label data L.

When the state determination device 1 is in a mode for performing the primary determination, the state observation unit 106 observes the manufacturing operation data S1, which is the data relating to the operation at the time of manufacturing the product of the manufacturing device 60, as the state variable S. The manufacturing operation data S1 is data relating to the operation of the manufacturing device 60 acquired when the manufacturing device 60 is manufacturing the product. For example, when the manufacturing device 60 is an injection molding machine, the manufacturing operation data S1 includes a torque (a current or a voltage) of a plasticizing screw driving motor in a molding operation of the injection molding machine, operating speed and a position of a plasticizing screw, a command value to a drive unit, material pressure, a mold clamping force, temperature, a physical quantity per molding cycle, a molding condition, a molded material, moldings, a shape of a component of injection molding machine, distortion of the component of injection molding machine, an operating sound, an operation image of the injection molding machine, and the like.

The manufacturing operation data S1 is data that can be acquired during a standard manufacturing operation of the manufacturing device 60, and may be any data as long as it can be used for normality/abnormality determination on the operation of the manufacturing device 60. In addition, the detection value obtained by the sensor 70 may be used as the manufacturing operation data S1 as long as the sensor is attached to the manufacturing device 60 in a standard manner. Each piece of the data acquired as the manufacturing operation data S1 may be a data value at a certain timing, and further, may be a data string obtained by sampling values successively acquired over one operation of the manufacturing device 60 at a predetermined cycle.

When the state determination device 1 is in the mode for performing the secondary determination, the state observation unit 106 observes the secondary determination operation data S2, which is the data relating to the operation for the secondary determination of the manufacturing device 60, as the state variable S. The secondary determination operation data S2 is data relating to the operation of the manufacturing device 60 acquired when the manufacturing device 60 is operating with an operation pattern for secondary determination. For example, when the manufacturing device 60 is an injection molding machine, the secondary determination operation data S2 includes a torque (a current or a voltage) of a plasticizing screw driving motor in a molding operation of the injection molding machine, operating speed and a position of a plasticizing screw, a command value to a drive unit, material pressure, a mold clamping force, temperature, a physical quantity per molding cycle, a molding condition, a molded material, moldings, a shape of a component of injection molding machine, distortion of the component of injection molding machine, an operating sound, an operation image of the injection molding machine, and the like.

The secondary determination operation data S2 is data that can be acquired when the manufacturing device 60 is performing the operation for secondary determination, and may be any data as long as it can be used for normality/abnormality determination on the operation of the manufacturing device 60. In addition, the sensor 70 that is not attached to the manufacturing device 60 in a standard manner may be attached at the time of the secondary determination and a detection value detected by the sensor 70 may be used as the secondary determination operation data S. Each piece of the data acquired as the secondary determination operation data S2 may be a data value at a certain timing, and further, may be a data string obtained by sampling values successively acquired over one operation of the manufacturing device 60 at a predetermined cycle.

When the state determination device 1 is in a mode for learning the secondary determination, the label data acquisition unit 108 acquires state label data L1 indicating the state of the manufacturing device 60 as the label data L. The label data acquisition unit 108 acquires a portion where a failure of the manufacturing device 60 has occurred and a content of the failure, as the state label data L1, from maintenance information of the manufacturing device 60 that has been input by a worker via an input device (not illustrated) during maintenance of the manufacturing device 60 and stored in a memory such as the nonvolatile memory 14.

The learning unit 110 follows an arbitrary learning algorithm collectively called machine learning to learn an outline of the state of the manufacturing device 60 with respect to the operation of the manufacturing device 60 as a primary determination learning model 112 and the state of the manufacturing device 60 with respect to the secondary determination operation of the manufacturing device 60 as a secondary determination learning model 114. The learning unit 110 can repeatedly execute learning based on a data set including the state variable S and the label data L described above.

Figure 3:
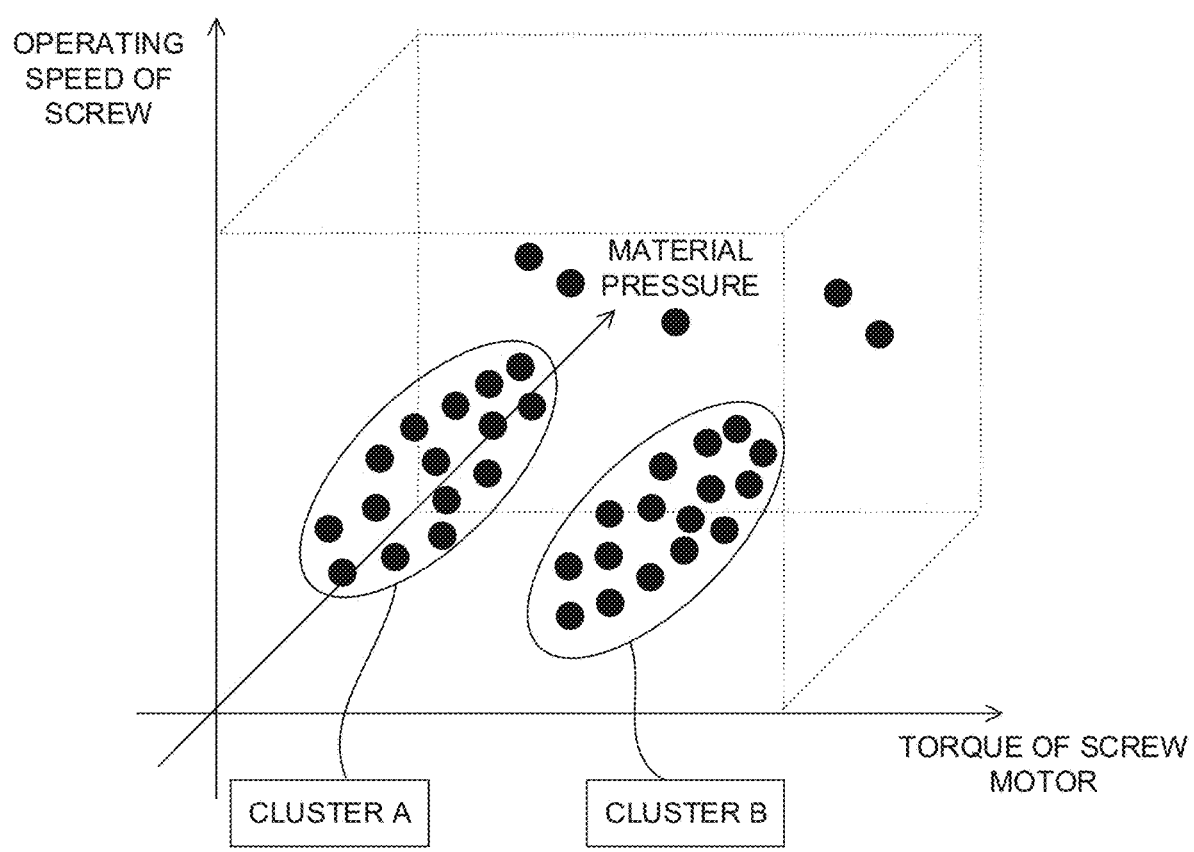
FIG. 3 is a graph for describing learning of a primary determination learning model performed by the state determination device.

The learning of the primary determination learning model 112 performed by the learning unit 110 is performed, for example, by so-called unsupervised learning of a normality/abnormality degree of the operation of the manufacturing device 60 with respect to the operation of the manufacturing device 60. FIG. 3 is a graph for describing a learning method of the primary determination learning model 112 using the unsupervised learning. Incidentally, the description will be given with an example in which a torque value of a plasticizing screw driving motor, operating speed of a plasticizing screw motor, and pressure of a material are acquired as data values at a certain timing and used as the manufacturing operation data S1 in the example of FIG. 3 in order to simplify the description. In the learning of the primary determination learning model 112, the learning unit 110 performs cluster analysis on the manufacturing operation data S1 acquired from the manufacturing device 60 (and the sensor 70) to form one or more clusters. For example, when the manufacture of the product of the manufacturing device 60 under a predetermined condition is started, the state determination device 1 collects the manufacturing operation data S1 until the operation is performed a predetermined number of times set in advance and store the collected data in the memory such as the nonvolatile memory 14. Then, when the manufacturing operation data S1 corresponding to a predetermined number of pieces of data set in advance (the number of pieces of data sufficient for performing the cluster analysis) is collected, the state observation unit 106 observes the collected manufacturing operation data S1, and construction (learning) of the primary determination learning model 112 (the cluster set) using the learning unit 110 is executed. Since it is possible to expect that the state of the manufacturing device 60 is normal at an initial stage of manufacture of the product of the manufacturing device 60 under the predetermined condition, the cluster created by performing the cluster analysis on the manufacturing operation data S1 at this stage can be expected to be a cluster of data in a case where the state of the manufacturing device 60 is normal. The learning of the primary determination learning model 112 by the learning unit 110 is normally executed at the initial stage of manufacture of the product of the manufacturing device 60 under the predetermined condition in this manner. Incidentally, it is possible to use, for example, known hierarchical clustering, non-hierarchical clustering, or the like as a learning algorithm of unsupervised learning.

The learning of the secondary determination learning model 114 performed by the learning unit 110 is performed by so-called supervised learning using the secondary determination operation data S2, acquired at the time of executing the operation pattern for the secondary determination executed by the worker performing maintenance when a problem occurs in the manufacturing device 60, and the state label data L1 obtained from data of results of the maintenance work input by the operator, as teacher data when the state of the manufacturing device 60 is abnormal. In the learning of the secondary determination learning model 114 performed by the learn ng unit 110, the worker may further cause the manufacturing device 60 to be executed with the operation pattern for the secondary determination after maintenance so that the secondary determination operation data S2 acquired at this time and the state label data 11 indicating the normality are used as the teacher data when the state of the manufacturing device 60 is normal. Incidentally, it is possible to use, for example, a known multilayer neural network, a Bayesian network, a support vector machine, a mixed Gaussian model, or the like as a learning algorithm of the supervised learning.

During the primary determination, the determination result output unit 122 determines the outline of the state of the manufacturing device 60 using a result (the primary determination learning model 112) learned by the learning unit 110 based on the manufacturing operation data S1, and outputs a result of the inference to the control unit 34. During the primary determination, the determination result output unit 122 calculates, for example, distances between the manufacturing operation data S1 acquired from the manufacturing operation of the product of the manufacturing device 60 and each cluster of data acquired from the normal operation of the manufacturing device 60 described with reference to FIG. 3, and may output a fact that there is a possibility that a certain abnormality has occurred in the manufacturing device 60, as a determination result, when the shortest distance among the calculated distances is equal to or larger than a predetermined first threshold or output a fact that there is a possibility that a certain urgent abnormality has occurred in the manufacturing device 60 as a determination result when the shortest distance among the calculated distances is equal to or larger than a predetermined second threshold (larger than the first threshold).

During the secondary determination, the determination result output unit 122 determines the state of the manufacturing device 60 using a result (the secondary determination learning model 114) learned by the learning unit 110 based on the secondary determination operation data S1, and outputs a result of the determination to the control unit 34. The determination result during the secondary determination output by the determination result output unit 122 includes, for example, the portion where the failure of the manufacturing device 60 has occurred and the content of the failure.

As one modification of the state determination device 1, the learning unit 110 may construct (learn) the primary determination learning model 112 so as to output any of the respective portions constituting the manufacturing device 60 where an abnormality has occurred in a probability or the like during the primary determination. In this case, for example, as the primary determination learning model 112, for example, the learning unit 110 may use a learning algorithm such as a known convolutional neural network (CNN) to store the manufacturing operation data S1 acquired by the manufacturing operation of the product by the manufacturing device 60 in the memory such as the nonvolatile memory 14, acquire abnormal portion data L2 indicating an abnormality occurrence portion of the manufacturing device 60 from information input by a worker when maintenance or the like is performed by the worker, as the label data L, and perform machine learning so as to output the probability of each class from an output side of the primary determination learning model 112, whereby it is also possible to output the probability of occurrence of the abnormality in each portion of the manufacturing device 60.

With this configuration, the worker can presume that there is an abnormality in a portion with the highest probability based on the output from the state determination device 1, and can perform the secondary determination in accordance with the presumption. In addition, it is also possible to determine an abnormality or normality with respect to an abnormal portion candidate obtained by the primary determination using an auto encoder such as a variational auto-encoder (VAE) for the secondary determination.

In addition to the above-described configuration, it is also possible to configure such that the secondary determination learning model 114 used for the secondary determination is created for each portion of the manufacturing device 60, and the secondary determination on the portion of the manufacturing device 60 is performed based on an appropriate operation pattern for the secondary determination in order to determine an abnormality of each portion. In this case, it is possible to configure each of the secondary determination learning models 114 with a simple structure by selecting a data items of the secondary determination operation data S1, and thus, it is also possible to prevent a known problem of overlearning accompanying an increase in speed of learning, and further, it is also possible to improve the abnormality determination accuracy in the secondary determination.

As another modification of the state determination device 1, the learning unit 110 can perform a rough determination in the primary determination on a portion where an abnormality has occurred and perform a further subdivided determination in the secondary determination. In this modification, for example, both the primary determination learning model and the secondary determination learning model are used as learning models constituting a classifier of a multi-layer perceptron to classify waveforms indicating changes of a torque of a driving motor of a molding machine, and each learning model is constructed such that, for example, the amount of wear of a sliding part constituting a drive unit driven by the driving motor is determined with rough accuracy (for example, in unit of minimum resolution of 1 mm) in the primary determination, and is determined with a finer accuracy (for example, in unit of minimum resolution of 0.5 mm) in the secondary determination. During molding of a product in the injection molding machine, it is difficult to determine a precise state because there are many uncertain factors due to the influence of a die and a molding condition, However, it is possible to easily improve the accuracy of the state determination by performing precise determination with an operation separating constraints according to the die and the molding condition as a specified operation in the secondary determination after performing the rough state determination.

The embodiment of the present invention has been described as above, but the present invention is not limited only to the above-described embodiments and can be implemented in various modes by applying suitable modifications.

For example, the learning algorithm and the calculation algorithm executed by the machine learning device 100, the control algorithm executed by the state determination device 1, and the like can adopt various algorithms without being limited to the above-described ones.

In addition, the description has been given in the above-described embodiment assuming that the state determination device 1 and the machine learning device 100 are devices having different CPUs, but the machine learning device 100 may be realized by the CPU 11 included in the state determination device 1 and the system program stored in the ROM 12.

Further, the determination performed by the state determination device 1 is divided into two stages of the primary determination and the secondary determination in the above-described embodiment, but it may be configured such that state determination divided into three stages or more is performed when applying the state determination device 1 of the present invention to a manufacturing system constituted by a plurality of manufacturing devices, for example, such that a primary determination is performed based on data acquired from the entire manufacturing system to make the primary determination to specify any device where an abnormality has occurred, performing a primary determination, a secondary determination is performed based on data acquired from the device determined in the primary determination that the abnormality has occurred, and a third determination is performed to determine any part of the device where the abnormality has occurred after stopping a manufacturing process.

The invention claimed is:

1. A state determination device for determining a state of a manufacturing device based on internal and external state variables acquired from an operation of the manufacturing device, the state determination device comprising:
 a processor configured to implement:
  a primary determination learning model that has learned an outline of the state of the manufacturing device based on the internal and external state variables acquired from the operation of the manufacturing device for manufacturing a product,
  a secondary determination learning model that has learned a state of the manufacturing device based on the internal and external state variables acquired from the operation of the manufacturing device in a predetermined operation pattern set in advance and information on maintenance of the manufacturing device, and
  a determination result output unit configured to carry out
   a primary determination on the outline of the state of the manufacturing device using the primary determination learning model based on the internal and external state variables acquired from the operation of the manufacturing device for manufacturing the product, and
   a secondary determination on the state of the manufacturing device using the secondary determination learning model based on the internal and external state variables acquired from the operation of the manufacturing device in the predetermined operation pattern set in advance executed at a predetermined opportunity,
 wherein the processor is configured to control the operation of the manufacturing device based on results of the primary determination and the secondary determination, and
 the internal and external state variables for the secondary determination include a detection value of a sensor, the detection value being not included in the internal and external state variables for the primary determination.

2. The state determination device according to claim 1, wherein
 the predetermined opportunity is at least any of within a predetermined period from a time when the primary determination is carried out, within a predetermined number of times of product manufacturing operations of the manufacturing device, and within a predetermined number of times of operations of the manufacturing device.

3. The state determination device according to claim 1, wherein the state determination device is configured as a part of a controller of the manufacturing device.

4. The state determination device according to claim 1, wherein the state determination device is configured as a part of a computer connected to a plurality of the manufacturing devices via a network.

* * * * *